3,090,401
STREET HOSE FOR PNEUMATICALLY ACTUATED PARKING METER
John R. Handley, Los Altos, Calif., assignor, by mesne assignments, to Calpat Products, Inc., a corporation of Nevada
Filed Nov. 12, 1958, Ser. No. 773,260
1 Claim. (Cl. 137—778)

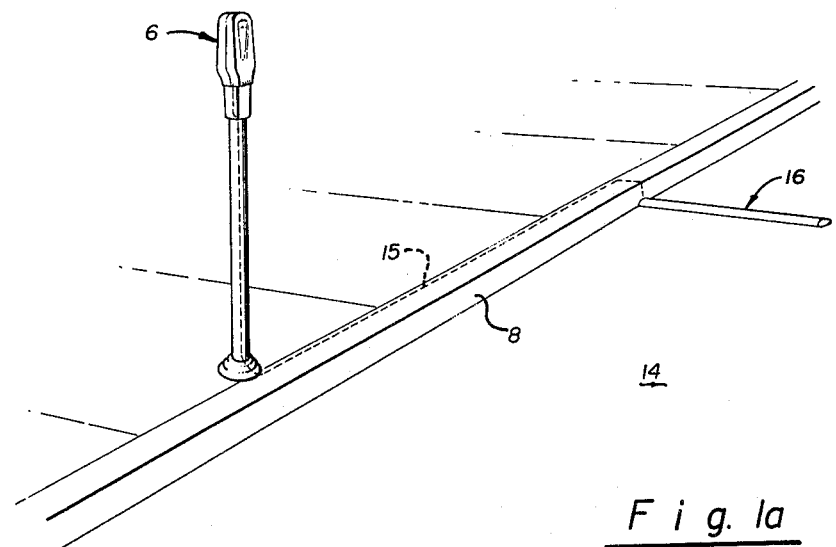
Fig. 1
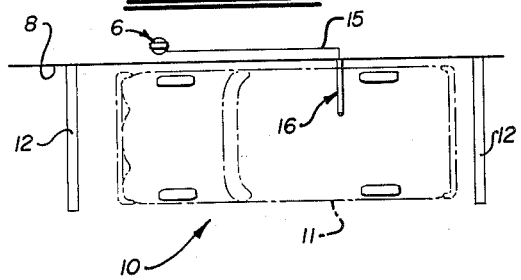
Fig. 1a
Fig. 11a
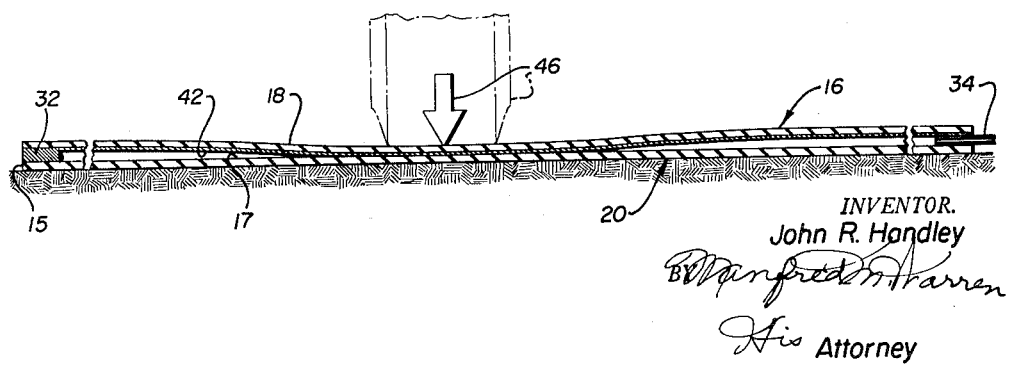
INVENTOR.
John R. Handley
His Attorney May 21, 1963  J. R. HANDLEY  3,090,401
STREET HOSE FOR PNEUMATICALLY ACTUATED PARKING METER
Filed Nov. 12, 1958  3 Sheets-Sheet 2
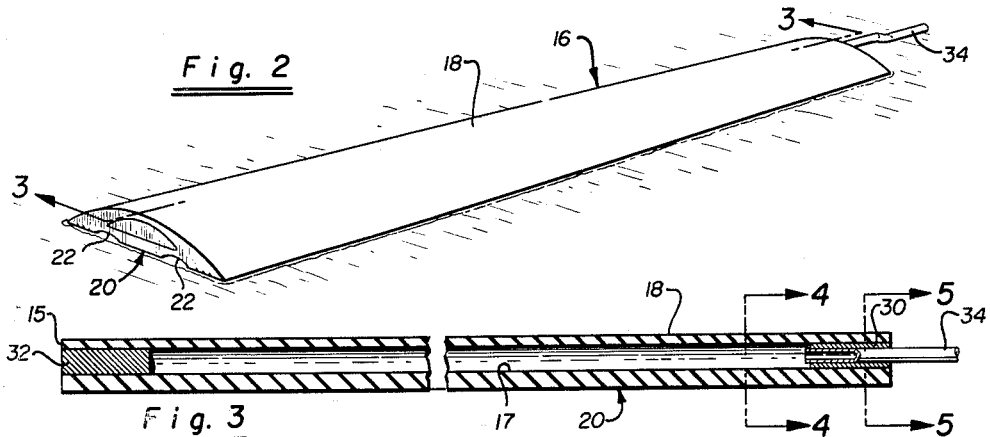
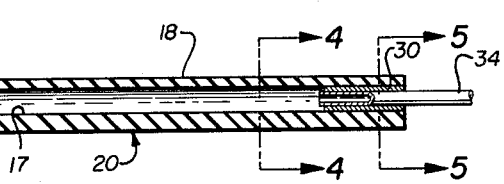
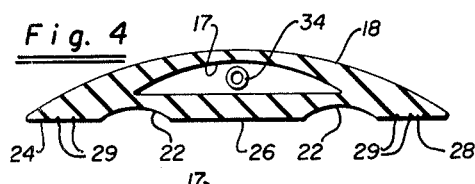
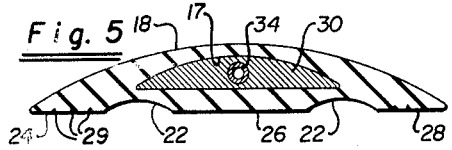
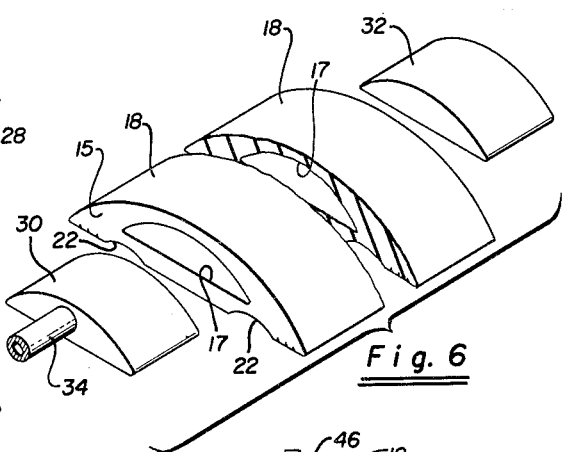
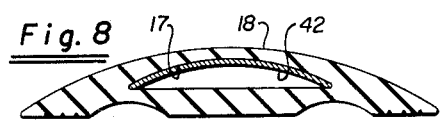
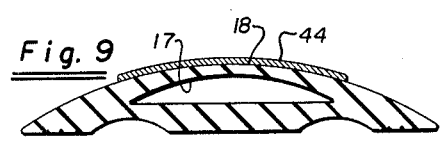
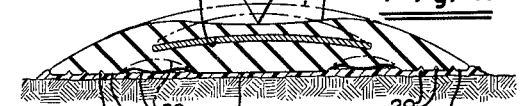
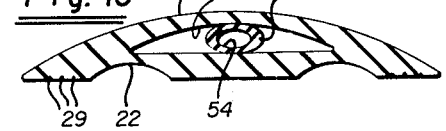
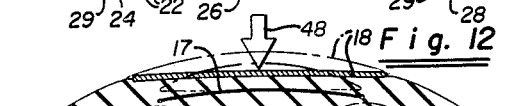
INVENTOR.
John R. Handley
BY
Attorney May 21, 1963  J. R. HANDLEY  3,090,401
STREET HOSE FOR PNEUMATICALLY ACTUATED PARKING METER
Filed Nov. 12, 1958  3 Sheets-Sheet 3
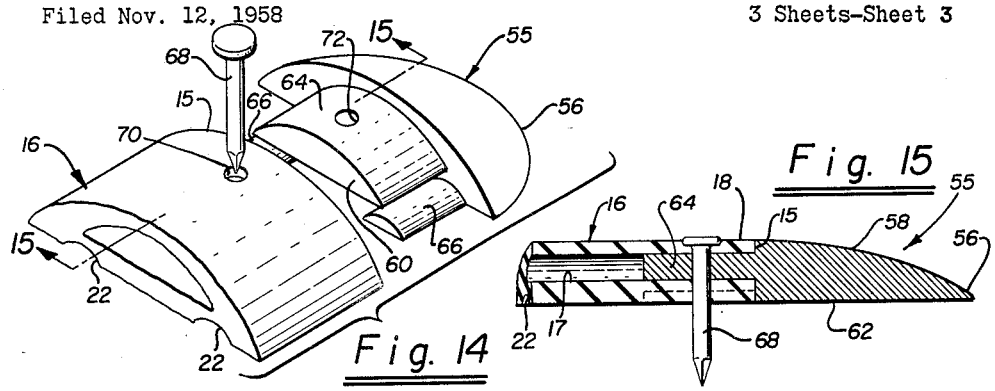
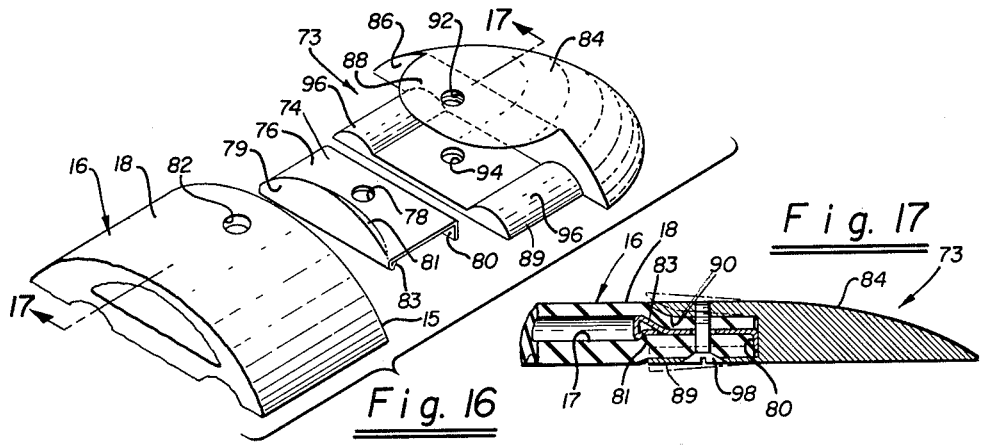
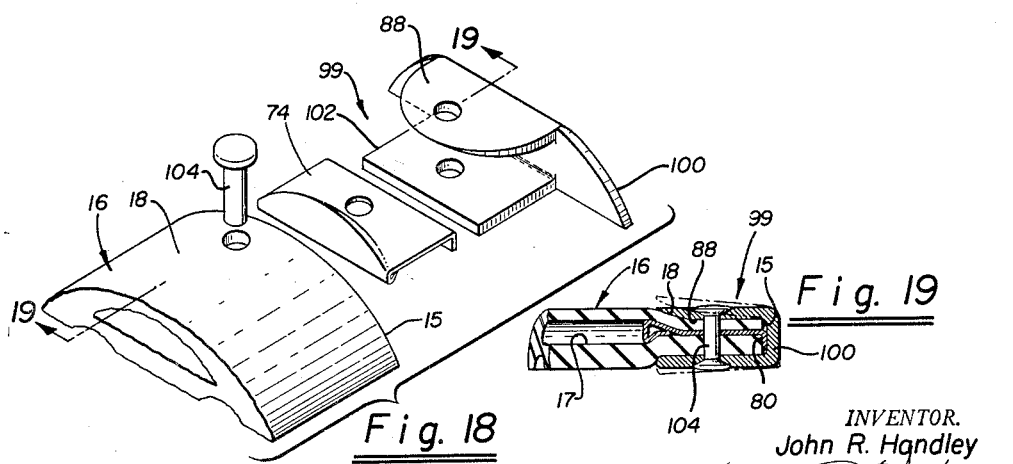
INVENTOR.
John R. Handley
BY Manfred M. Warren
His Attorney

The invention relates to a pneumatic hose construction and more particularly to a pneumatic hose mounted in a portion of a street surface defining vehicle parking space for traversing by a wheel of the vehicle leaving the parking space to provide an air pulse for actuating a pneumatically operated time cancellation mechanism in a parking meter controlling the parking space.

It is an object of this invention to provide a street hose of the character indicated which is low in cost of manufacture, sturdy in construction, durable in use to withstand hard wear over extended periods, and wear-resistant in constant service under varying weather conditions and under repeated street cleaning operations.

Another object is to provide a street hose of the character described which is designed for ready application to a street surface by being adhesively secured thereto to lie flat thereon and resist separation from the street surface to effect a permanent installation.

Still another object is to provide a pneumatic hose structure which may be extruded in length and readily cut to the most convenient and economical size for a particular installation.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claim:

Referring to said drawings (3 sheets):

FIGURE 1 is a schematic view of a portion of a street and curbing therefor defining a parking space controlled by a parking meter with the street hose embodying the invention mounted in the parking space.

FIGURE 1A is a fragmentary plan view of FIGURE 1 showing an automobile in phantom lines in the parking space.

FIGURE 2 is an enlarged perspective view of the hose shown in FIGURES 1 and 1A.

FIGURE 3 is a cross sectional view taken on line 3—3 of FIGURE 2 and shown on an enlarged scale.

FIGURE 4 is a cross sectional view taken on line 4—4 of FIGURE 3 and on a somewhat enlarged scale.

FIGURE 5 is a cross sectional view taken on line 5—5 of FIGURE 3 and on a somewhat enlarged scale.

FIGURE 6 is an exploded perspective view of the street hose of FIGURE 2, broken away intermediate its ends, including the end seal plugs therefor.

FIGURES 7–10 are cross sectional views similar to FIGURE 4 showing different modifications in construction of the hose.

FIGURES 11–13 are cross sectional views corresponding to FIGURES 8–10 respectively, showing the hose deformed by pressure applied from above.

FIGURE 11A is longitudinal cross section through the modified hose construction of FIGURE 8 deformed in the manner shown in FIGURE 11.

FIGURE 14 is an exploded perspective view showing one end of a street hose with a modified form of end plug therefor.

FIGURE 15 is a central vertical cross section longitudinally through the hose and plug of FIGURE 14 with the plug secured in sealing relation within the end of the hose.

FIGURE 16 is an exploded perspective view similar to FIGURE 14 but showing a different form of the end plug.

FIGURE 17 is a central vertical cross section longitudinally through the hose and plug of FIGURE 16 with the plug disposed in its end sealing relation secured within the hose.

FIGURE 18 is an exploded perspective view similar to FIGURE 14 but showing another form of end plug.

FIGURE 19 is a cross section taken vertically longitudinally along the center of the hose with the end plug of FIGURE 18 secured therewithin.

Parking meter 6 is mounted on curb 8 for controlling the parking space 10 for an automotive vehicle 11, delineated between lines 12 marked on street 14, and is of the type having a pneumatically actuated time cancellation mechanism for returning the meter to zero position when a vehicle leaves the parking space. Pneumatic street hose 16 made of resiliently deformable material, such as high quality Neoprene, is operatively connected to meter 6 through a conduit 15 and is mounted in the parking space in position for traversing by a wheel of the vehicle 11 upon leaving the parking space to provide an air pulse for operating the time cancellation mechanism. Hose 16 has an internal passage 17 defined in part by a deformable transversely convexly curved top wall 18 and a flat bottom 20 provided with one or more parallel longitudinal relief channels 22 into which the material can flow upon deformation of hose top wall 18 when traversed by a wheel of vehicle 11 leaving parking space 10 to create the actuating air pulse in the hose.

Bottom 20 of the hose has a plurality of longitudinally extending flat lands 24, 26 and 28 having their outer surfaces lying in a common plane. Lands 24 and 28 are each provided with a plurality of narrow longitudinally extending slits 29 into which an adhesive, such as Minnesota Mining and Manufacturing Company's No. EC 1300, can flow when applied to the outer surfaces or undersides of the lands for adhesively securing the hose 16 onto the street. Relief channels 22 are formed between lands 24, 26 and 26, 28 as seen to good advantage in FIGURE 6. Since, upon deformation, the resilient material of the hose will flow into channels 22, pressure on the adhesive bond between the hose and the street applying a strain on the adhesive bond will be substantially reduced.

Internal passage 17 is formed so that it is elongated in its transverse dimension. Transversely spaced channels 22 underlie the opposite transverse edges of the passage so that a portion of each channel is arranged to extend beyond the transverse edge of the passage which it underlies thereby insuring total collapse of the passage 17 to create an air pulse upon deformation of any portion of top wall 18 by providing a space into which the resilient material can flow as the top wall is deformed.

End plugs 30 and 32 seal the opposite ends of passage 17. Each plug is shaped to conform to the interior of the passage and is driven thereinto with a tight force fit providing an air-tight seal for a length of the hose which has been cut to desired size for the particular installation from a considerably greater length of the hose preferably made by a simple extrusion process. One end plug 30 has one end of conduit 34 extending longitudinally therethrough and in communication with the interior passage 17. The other end of the conduit is operatively connected to the time cancellation mechanism of the meter 6 to conduct the air pulse created in hose 16 to said mechanism. For an example of such a time cancellation mechanism see companion application Serial No. 769,889 of myself and Rollin A. Armer entitled Parking Meter and Time Release Structure Therefor now Patent No. 3,054,251.

In the different forms of hose construction shown in each of FIGURES 7, 8 and 9, the hose of FIGURES 2–6 has been modified by the provision of resiliently flexible metal shield disposed in overlying relation to the interior passage 17 to protect the passage from being cut into or pierced through the top wall to puncture the passage and render the hose inoperative for the purpose intended, and to increase the wear-resistant quality of the hose during normal service. Additionally, the metal shield functions to provide a wiping action spreading the action of the force applied by the traversing of a vehicle wheel, longitudinally along the top wall of the hose as depicted in FIGURE 11A to result in a greater area of deformation of the top wall 18 and thus substantially increasing the volume of the interior passage which will collapse to create a relatively stronger air pulse for the actuation of the pneumatic time cancellation mechanism in meter 6.

In FIGURE 7, the metal shield is in the form of a sheet of woven metal mesh 40 imbedded in top wall 18 and shaped to generally conform to the transverse curvature of the top wall and overlying passage 17. A solid resiliently flexible plate 42 of sheet material defines the metal shield in the hose construction of FIGURE 8. Plate 42 is normally transversely curved and conformably disposed within passage 17 to define the top wall thereof and is formed as a normally self-restoring concavo-convex sheet of resilient metal functioning to move to and from its normally arched and flattened forms with snap action. In the modified hose construction shown in FIGURE 9, the metal shield is a resiliently flexible sheet metal plate 44 secured by a suitable adhesive, as for example Du Pont adhesive 910, onto the upper surface of the top wall 18 of the hose to extend centrally longitudinally thereof and to conform to the transverse curvature of the top wall.

This plate 44 is preferably also made of thin resilient sheet metal and of a concavo-convex form rendering it self-restoring to its normally arched shape thus aiding in the reformation of the hose after being traversed by a wheel of the parking vehicle.

As the downward force is applied to the top wall of the hose, by being traversed by vehicle 11, as indicated by arrows 46 and 48 in respective FIGURES 11 and 12, each of the metal plates 42 and 44 will be resiliently flexed from its normal transversely curved form to a substantially flat condition as shown. Although a force may be applied to directly affect only one small portion of the metal shield, i.e. plates 42 and 44 or the wire mesh 40, the wiping action above discussed spreads the applied force longitudinally along the metal shield to enlarge area of deformation of top wall 18, longitudinally of the hose.

FIGURES 10 and 13 illustrate a further modified hose construction in normal and operative positions respectively. In this form of the invention a pressure tube 50 of resilient material is disposed to extend longitudinally within the interior passage 17 in slightly compressed condition to contact the top and bottom walls thereof to effect an outward resilient pressure on the top and bottom wall of the passage and with opposite ends of tube 50 opening into the passage 17. As a downwardly directed force is applied, as indicated by arrow 52, the top wall 18 will deform as shown in FIGURE 13, collapsing the passage 17 and compressing tube 50 to close the interior passage 54 therethrough and create an air pulse in tube 50 as well as in passage 17, for actuation of the time cancellation mechanism of the meter. Reformation of tube 50 upon release of the downwardly directed force assists in resiliently urging the hose to return to its original form. In effect, tube 50 is a resilient means for restoring the hose to its original shape after cessation of downward pressure thereon and also serves as a reinforcing rib within passage 17 to impart increased rigidity to the hose 16.

Means, other than the solid end plug 32, for sealing an end 15 of hose 16 is provided by the different plug assemblies shown in FIGURES 14, 16 and 18 respectively. In all of these forms, the sealing means comprises a plug assembly including a body portion having an end face conformably abutting the one end 15 of hose 16 to be sealed, a plug member shaped with an elongated transverse dimension conforming to the shape of interior passage 17 and disposed therein with a tight force fit to seal the passage, and fastening means for securing the plug member within the passage. Specifically, the plug assembly 55 of FIGURES 14 and 15 includes a plug body member 56 having a convexly curved top wall tapering downwardly as it recedes from a vertical end face 60 conformably shaped with and abutting the one end 15 to the flat bottom 62 of the body member. A plug member 64, shaped to conform substantially in shape and size to that of interior passage 17, is carried by end face 60 to project outwardly therefrom and force fitted into passage 17 through end 15 to seal the passage at this end. Spaced locating strips 66 are carried by end face 60 to extend longitudinally outwardly therefrom along its bottom 62 and project into and fill relief channels 22. Suitable fastener means, such as headed nail 68, is inserted through registering holes 70 and 72 through the hose 16 and plug member 60 respectively and adapted to be driven into a supporting surface, such as street 14, for securing the plug member against displacement with passage 17, as shown in FIGURE 15. In its sealing relation with hose 16, plug assembly 55 affords a smooth, unbroken extension of the hose.

The sealing means illustrated in FIGURES 16 and 17 is defined by plug assembly 73 comprising a separate plug member 74 formed of flat sheet material and having a central plate 76 with a hole 78 transversely therethrough and having an upstanding seal flange 79 carried at one end of the plate and a locating flange 80 dependingly carried at the other end thereof. Seal flange 79 fabricated to conform substantially to the shape and size of interior passage 17 and having rearwardly extending downwardly inclined tabs 81 and 83 carried by the top and bottom ends respectively, is inserted within the hose passage through end 15 thereof with a force fit with locating flange 80 abuttingly engaging the end face of the adjacent hose end so that hole 78 is in register with aperture 82, and the passage 17 is sealed to prevent the escape of air through end 15 by the seating of the seal flange therein, as shown in FIGURE 17. Assembly 73 also includes a body member 84, shaped similarly to member 56 of FIGURES 14 and 15, having a vertical end face 86 generally conforming to the shape and size of the end 15 of the hose. End face 86 carries upper and lower clamp jaws 88 and 89 respectively extending longitudinally outwardly therefrom. With end face 86 placed in abutting relation with end 15 of the hose, upper jaw 88 has its lower convexly curved surface 90, tapering downwardly as it recedes from the free end of the jaw toward end face 86, in overlying contact with top wall 18 with an internally threaded opening 92 through jaw 88, in register with aperture 82. Lower jaw 89 underlies the bottom of the hose with a hole 94 transversely therethrough registering with the other end of aperture 82. Lower jaw 89 is provided with transversely curved, enlarged portion 96 extending longitudinally along opposite side edges thereof to enter and fill relief channels 22 when body member is in abutment with hose end 15. Means in the form of a screw 98 is inserted in hole 94 to project through aperture 82 and registering opening 78 and into threaded engagement with threaded opening 92 to draw the jaws 88 and 89 together to clamp the hose therebetween as the jaws are moved toward each other as from the broken to the solid line positions shown in FIGURE 17. It will be noted that with the clamping jaws tightened, the plug assembly 73 presents a smooth, unbroken extension of the hose.

The plug assembly 99 shown in FIGURES 18 and 19 is substantially the same as plug assembly 73 except for the deletion of the rearwardly extending, transversely curved tapering portion of the body member in the corresponding plate-like body member 100, the omission of the enlarged end portions in the corresponding lower jaw 102 and the use of a rivet 104 as means for drawing upper jaw and lower jaw 102 together.

In the plug assemblies 73 and 99, the hose 16 adjacent the end 15 thereof is deformed by the clamp action of the upper and lower jaws, so that the interior passage 17 is collapsed with the plate 76 of the plug member tightly sandwiched between the upper and lower walls of the collapsed passage to further increase the air-tight effectiveness of the plug assemblies, as shown in FIGURES 17 and 19.

I claim:

An automobile tire actuated street positioned pneumatic sensing device comprising, an elongated rubber body having an elongated internal cavity and formed with a flat bottom for resting upon the street and an oval top wall as viewed in cross-section and across which a tire may roll for collapsing said top wall into said cavity to produce a pneumatic pressure pulse, said oval formed top wall functioning to direct the collapse of the said top wall into said cavity for minimal lateral shifting force on said bottom; an elongated resilient metal spring of concavo-convex cross-sectional form conforming generally to said oval form and carried by said top wall for joint movement therewith and providing a continuous longitudinal reinforcement over the full length of said cavity to enforce extended collapse of said cavity when traversed by said tire, and said body bottom being provided with a pair of longitudinal relief channels into which said spring and body can flow upon deformation thereof.

References Cited in the file of this patent

UNITED STATES PATENTS

| | | |
|---|---|---|
| 490,353 | James | Jan. 24, 1893 |
| 1,184,371 | Myers | May 23, 1916 |
| 1,507,242 | Meriam | Sept. 2, 1924 |
| 1,626,620 | Mentzer | May 3, 1927 |
| 1,725,963 | Morris | Aug. 27, 1929 |
| 1,889,602 | Hill | Nov. 29, 1932 |
| 1,992,929 | Fator | Feb. 26, 1935 |
| 1,998,222 | Conklin | Apr. 16, 1935 |
| 2,051,042 | Hendel et al. | Aug. 18, 1936 |
| 2,060,890 | Olafson | Nov. 17, 1936 |
| 2,107,350 | Stubbins | Feb. 8, 1938 |
| 2,138,549 | La Bell | Nov. 29, 1938 |
| 2,163,960 | Paver | June 27, 1939 |
| 2,365,063 | Downey | Dec. 12, 1944 |
| 2,403,277 | Hall | July 2, 1946 |
| 2,406,745 | Curtze | Sept. 3, 1946 |
| 2,437,006 | Simpson | Mar. 2, 1948 |
| 2,454,555 | Henderson et al. | Nov. 23, 1948 |
| 2,519,634 | Burton | Aug. 22, 1950 |
| 2,546,433 | Dick | Mar. 27, 1951 |
| 2,550,970 | Carpenter et al. | May 1, 1951 |
| 2,562,847 | Spencer | July 31, 1951 |
| 2,595,452 | Geist et al. | May 6, 1952 |
| 2,770,696 | Koenig | Nov. 13, 1956 |
| 2,840,113 | Simpson et al. | June 24, 1958 |
| 2,858,394 | Hopkins | Oct. 28, 1958 |